(12) United States Patent
Arslan et al.

(10) Patent No.: US 6,707,789 B1
(45) Date of Patent: Mar. 16, 2004

(54) FLEXIBLE SONET RING WITH INTEGRATED CROSS-CONNECT SYSTEM

(75) Inventors: Ahmet Vecdet Arslan, West Windsor, NJ (US); Bruce Gilbert Cortez, Marlboro, NJ (US); Sid Chaudhuri, East Brunswick, NJ (US)

(73) Assignee: AT&T Corp., New York, NY (US)

( * ) Notice: Subject to any disclaimer, the term of this patent is extended or adjusted under 35 U.S.C. 154(b) by 0 days.

(21) Appl. No.: 09/432,549

(22) Filed: Nov. 3, 1999

Related U.S. Application Data
(60) Provisional application No. 60/112,791, filed on Dec. 18, 1998.

(51) Int. Cl.[7] ............................................... H04L 12/26
(52) U.S. Cl. ..................... 370/218; 370/222; 370/230; 370/237; 370/352; 370/360; 370/389
(58) Field of Search ............................. 370/230, 230.1, 370/235, 237, 352, 360, 389, 395, 392, 218, 220, 222; 359/115, 117

(56) References Cited

U.S. PATENT DOCUMENTS

| | | | | |
|---|---|---|---|---|
| 5,568,300 A | * | 10/1996 | Ishibashi | |
| 5,838,681 A | * | 11/1998 | Bonomi et al. | 370/395 |
| 5,850,395 A | * | 12/1998 | Hauser et al. | 370/398 |
| 5,870,538 A | * | 2/1999 | Manning et al. | 395/183.18 |
| 5,953,314 A | * | 9/1999 | Ganmukhi et al. | 370/220 |
| 6,122,252 A | * | 9/2000 | Aimoto et al. | 370/235 |
| 6,229,788 B1 | * | 5/2001 | Graves et al. | 370/230 |
| 6,426,952 B1 | * | 7/2002 | Francis | 370/380 |

* cited by examiner

*Primary Examiner*—Steven H. D Nguyen
*Assistant Examiner*—Roberta Stevens

(57) ABSTRACT

Flexibility is achieved in provisioning communication rings with an integrated DCS that allows any port that is connected to a line interface unit within the integrated DCS to be coupled within the integrated DCS—pursuant to software controlled provisioning—to any other port that is connected to a line interface unit within the integrated DCS. This is accomplished by merging the cross connect fabrics of the ADM portions of the integrated DCS with the cross connect fabric of the DCS portion of the integrated DCS, by incorporating at least some of the switching controls of the ADMs in the ADM portion of the integrated DCS in the controller of the DCS, and by insuring that the SONET K-bytes can be passed by the controller of the flexible integrated DCS from any line interface unit to any other line interface unit.

16 Claims, 4 Drawing Sheets

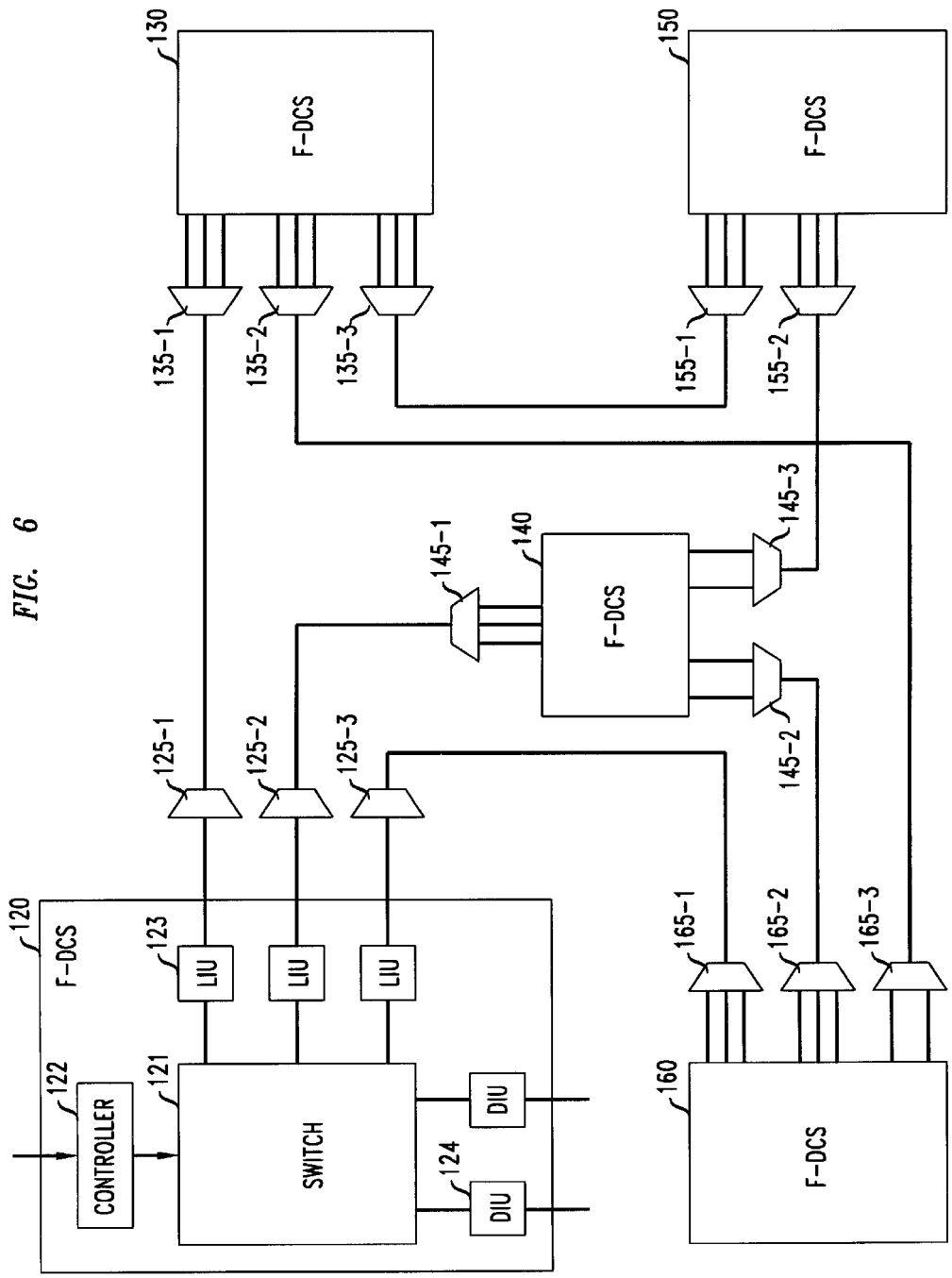

FLEXIBLE SONET RING WITH INTEGRATED CROSS-CONNECT SYSTEM

RELATED APPLICATION

This invention claims priority from a provisional application No. 60/112,791 filed Dec. 18, 1998.

BACKGROUND OF THE INVENTION

This invention relates to communication and, more particularly to cross connect systems.

There are two distinct types of network elements that are used in transport networks: Digital Cross-Connect Systems (DCS) and Add/drop Multiplexers (ADMs). With the advent of the SONET standard, these network elements have SONET capabilities and are called as SONET DCS and SONET ADM. It is to be understood that when the term SONET is used in this document, the corresponding international standard Synchronous Digital Hierarchy (SDH) is also included and it is interchangeable with SONET. FIG. 1 shows the architecture of a SONET DCS, and FIG. 2 shows the architecture of an ADM. As can be observed, their architectures are quite similar. The SONET DCS has a switch fabric 100 that is responsive to a controller 101, and line interface units 104, 114, and 124 that are coupled to the switch. Elements 101, 104, 114, and 124 operate under control of controller element 102. The ADM includes switch fabric 27, line interface units 21 24, and controller 28 that communicates with the switch fabric and the interface units.

To elaborate, each interface unit in a SONET DCS contains one or more external system transmission interfaces that can handle different data rates. In SONET, the lowest rate is known as STS-1, and the higher rates that are typically employed are OC-3, OC-12, OC-48, and OC-192 (representing 3, 12, 48, and 192 times the data rate of OC-1). A system can start with one interface unit and grow with the addition of more interface units as needed. Each interface unit has one port at the output of the DCS and one or more ports connected to the cross connect fabric. The signals flowing through the ports that are connected to the cross connect fabric are sometimes referred to as "tributaries." In a DCS, a tributary from any port can be connected to any other port through the cross connect fabric, under software controlled commands.

In addition to controller 101, the control structure for a SONET DCS typically comprises a central controller 102 that resides within the DCS, with connections to controllers within the interface unit and controller 101. The central controller also maintains communications interfaces for communicating to external control systems.

Functionally, the SONET DCS is used to multiplex and groom SONET payloads across the different SONET line rates. The DCS can connect traffic between rings, and manage complicated connections in the office by being a central point that connects SONET ADMs on different rings and that couples other equipment (such as an end office) to the network. The SONET DCS is not required to immediately reroute at the time of the failure. Normally, it reports failure events to a central system and waits to be told how to reconfigure in response to a failure.

It is also possible to reroute traffic through the SONET DCS in case of a failure autonomously, using a distributed communications protocol. However, implementation of distributed restoration using DCS is not so common. One reason is that it is not so simple to implement the distributed rerouting protocol in a DCS network, and the other reason is that it is not easy to make such rerouting as fast as it is done in a SONET ring.

While the SONET DCS and SONET ADM are architecturally quite similar, the DCS and the ADM are targeted for different applications, and correspondingly, their characteristics are quite different. To illustrate, the cross connect fabric of an ADM is extremely small (on the order of a dozen input ports and a dozen output ports) whereas the cross connect fabric of a DCS may be quite large (e.g., thousands of ports). The SONET ADM architecture is, effectively, a lower capacity version of the SONET DCS architecture.

More particularly, the SONET ADM comprises line interface units 21–24, drop interface units 25–26. In a typical four-fiber arrangement there is:

one (service) fiber pair (transmit and receive) that carries service traffic in the "east" direction, another fiber pair in the east direction whose primary function is to serve as a backup for the east direction traffic, should the service fiber fail (the backup or protection fiber in some applications is allowed to carry low priority traffic that may be preempted), one (service) fiber pair that carries service traffic in the "west" direction, and another fiber pair in the west direction whose primary function is to serve as a backup for the west direction service traffic, should the service fiber fail, (the backup or protection fiber in some applications is allowed to carry low priority traffic that may be preempted.

One capability that is usually targeted to the SONET ADM is "ring functionality". There are several types of SONET ring functionalities that are available in different SONET ADMs—Uni-directional path switched rings (UPSR), 2-fiber bidirectional path switched rings (BLSR), and 4-fiber BLSR. All of these rings comprise a sequence of SONET ADMs arranged in a closed loop. When a facility failure occurs, such an outside plant fiber being cut by construction equipment, the SONET ADMs react to the failure and reroute all of the traffic within 60–100 msec. This is done by the ADM whose one of two ports cannot handle traffic because of a failure condition in the link connected to that port applying that traffic to a spare fiber or to the fiber that carries traffic in the reverse direction in the ring. Although the arguments apply equally well to both 2-fiber and 4-fiber rings, our discussion here particularly adheres to 4-fiber case for simplicity of discussion. Because of this survivable architecture, the SONET ADM and the ring architecture are used in many critical network applications.

An ADM terminal in such an arrangement comprises four high-speed line interface units, one for each of the fiber pairs. Other than the drop-off traffic and the add-on traffic on the protection lines, under normal conditions the ADM cross connect sends all traffic from the east pair of line interface units to the west pair of line interface units. The drop interface units are interfaces that are employed for connecting to DCS elements, or to other elements (such as an end office). For an OC-48 ring typical drop interfaces are OC-3 and OC-12 and for an OC-192 ring typical drop interface units are OC-3, OC-12 and OC-48.

During the provisioning period of the ADM ring, messages are passed around the ring using the SONET Data Communications Channel (DCC) that is in-band within the SONET overhead. Some of these messages are used to configure the ring. At the time of a failure, bit-oriented messages are passed from node to node using the SONET K-byte protocol (henceforth, "K-byte messages"). The ADM controller reads these messages from one side of the ring, processes the message and passes the message to the other side of the ring or back out in the reverse direction that the message came in. These messages are handled with low latency because they are designed to support the goal of restoration due to fiber failures in as little as 50 msec. As necessary (when a failure occurs), the ADMs cross connect reroutes the traffic to the backup fiber that sends traffic in the same direction as the failed fiber, or sends the traffic over the backup fiber that carries traffic in the opposite direction.

A typical network architecture using SONET DCS is shown in FIG. 3, where SONET rings 10, 11, and 12 are inter-coupled via SONET DCS 13. Traffic originating from a node in a ring (e.g., traffic that is placed onto ring 10 by ADM node 101 from drop 1011) and terminating at another node in the ring (e.g., ADM node 102) is routed merely over the ring. On the other hand, traffic between two nodes in two different rings is routed through the DCS, which forms an interconnection point between multiple rings.

For example, a signal between ADM nodes 114 and 121 is routed through ring 11, DCS 13 and ring 12.

As stated earlier, a conventional DCS primarily provides the function of grooming and routing traffic among the rings that are connected to the DCS and ports of the DCS that participate in inter-coupling different rings are connected to ADMs of those rings. Often, those ADMs are co-located with the DCS. Manufacturers have realized, of course, that it would be less expensive if the ADMs that are co-located as the DCS—such as ADMs 104, 124, and 115 in FIG. 3—were integrated with the DCS. One advantage of an integrated DCS is that the expensive optical interfaces for interconnecting the multiple ADMs and the DCS are eliminated. Another advantage of an integrated DCS is that it offers higher reliability. Still another advantage of an integrated DCS is that by combining the multiple network elements under the single control system it makes the operations and management functions simpler.

Other than the above-mentioned differences (and the advantages that accrue), the integrated DCS is essentially an aggregation of the DCS and the ADMs in a single equipment unit. In particular, each ADM-like port of the integrated DCS is coupled through line interface units to a small cross connect fabric. This cross connect fabric is connected to another line interface unit and to a drop interface unit that is internally connected to the main cross-connect fabric of the DCS. All ring switching functions of an ADM portion of the integrated DCS are performed by a controller that is associated with the ADM portion of the integrated DCS, including the passing of SONET K-byte messages between the line interface units. The DCS cross-connect fabric is used to connect low-speed interfaces to the high-speed ring interfaces and to interconnect the low speed interfaces of multiple rings. Thus, traffic that needs to go between two different rings does not need to be connected through external drop ports; rather the traffic is routed directly through the cross-connect fabric. The ability of connecting the low-speed tributaries from one ring to another without external physical low-speed interfaces in a DCS is a distinct feature of integrated rings compared to ADM-based rings interconnected by DCS.

The problem with ring arrangements that employ either the standard DCS/ADM connections, or the integrated DCSs, is the associated lack of flexibility in configuring the rings. In an ideal planning environment, a network operator would install raw transport capacity between nodes along fiber routes, and then use this capacity to create a ring structure, as needed and when needed, simply though software control from a central management system. That is not possible in the above-described arrangements. The ADMs (or the ADM portions of a DCS) have to be physically connected by fibers in a predetermined way. Once a fiber is connected to a particular ADM (or a particular port of the ADM portion of the DCS), continuation of the ring is fixed to that ADM (or to a specific port of the ADM portion of the DCS). The ring is constructed by going from one node to another (be it an ADM or an integrated DCS), each time making sure that the fiber going out of the node is connected to the other line interface of the ADM or the correct port of the ADM in the integrated DCS. This makes the ring structure fixed. If, at some point in time, it is necessary to change the ring configuration, it is not possible to do so without physically changing the fiber connections.

SUMMARY OF THE INVENTION

An improvement in the art is realized with a flexible integrated DCS that allows any port that is connected to a line interface unit within the integrated DCS to be coupled within the integrated DCS—pursuant to software controlled provisioning—to any other port that is connected to a line interface unit within the integrated DCS. This is accomplished by merging the cross connect fabrics of the ADM portions of the integrated DCS with the cross connect fabric of the DCS portion of the integrated DCS, by incorporating at least some of the switching controls of the ADMs in the ADM portion of the integrated DCS in the controller of the DCS, and by insuring that the SONET K-bytes can be passed by the controller of the flexible integrated DCS from any line interface unit to any other line interface unit. Further, the integration of the ring switch fabric and the cross-connect fabric gives rise to a need for inter-ring connection coordination when multiple rings are terminated in a DCS.

BRIEF DESCRIPTION OF THE DRAWINGS

FIG. 6 shows how rings can be dynamically provisioned with the flexible DCSs disclosed herein.

DETAILED DESCRIPTION

Figure 1:
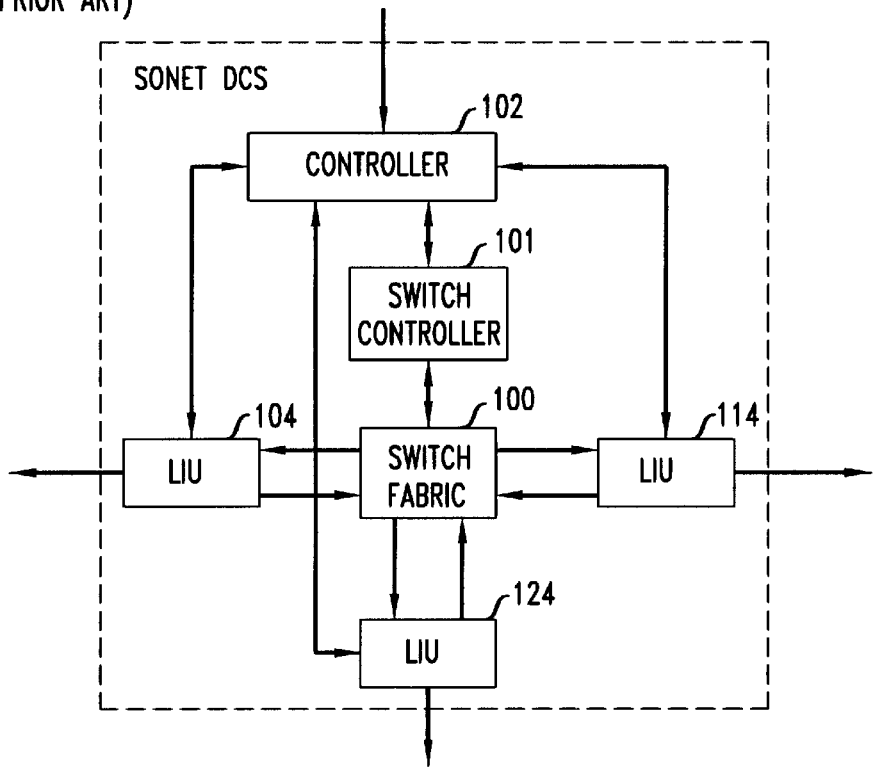
FIG. 1 depicts the block diagram of a prior art DCS.
Figure 2:
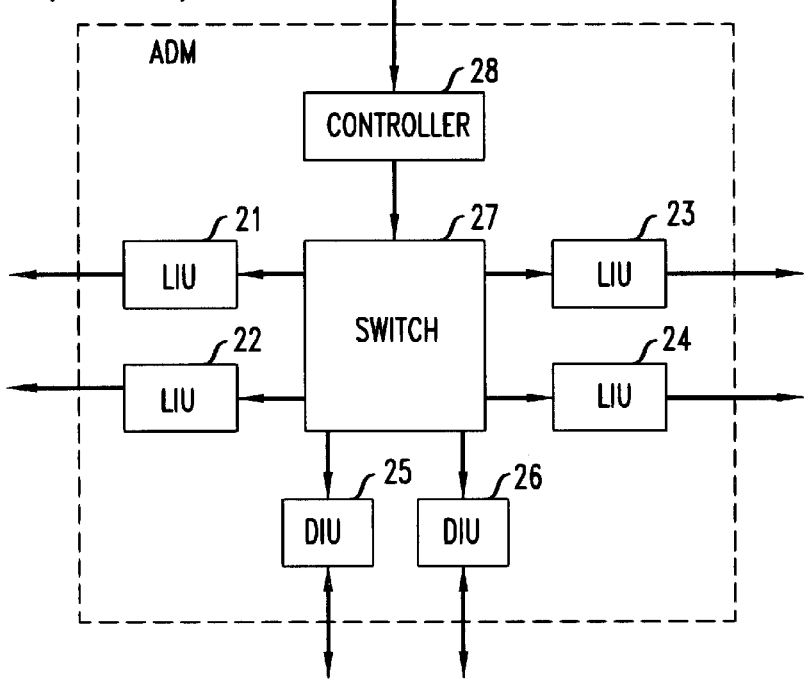
FIG. 2 depicts the block diagram of a prior art ADM.
Figure 3:
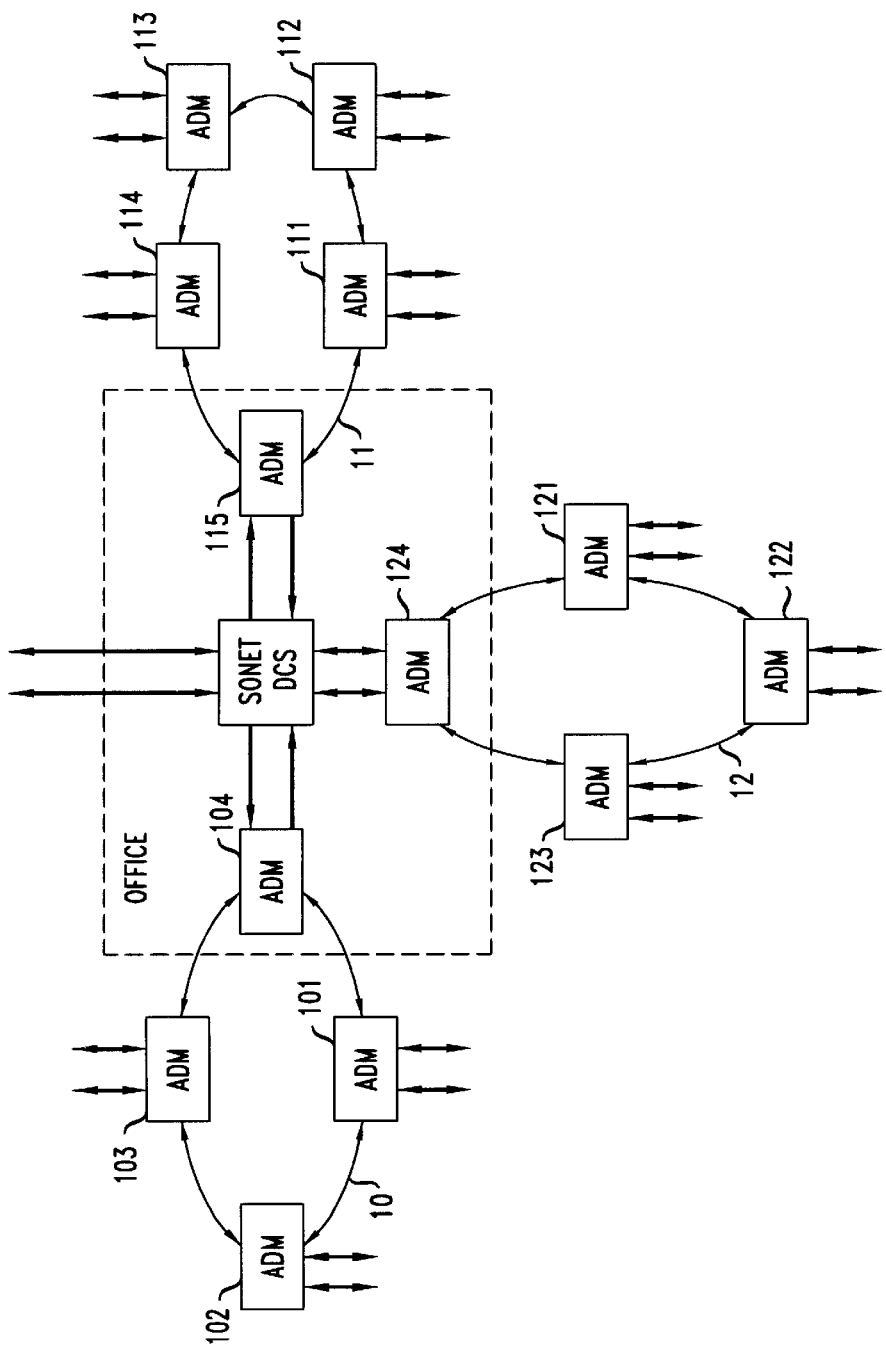
FIG. 3 illustrates a prior art SONET ring.
Figure 4:
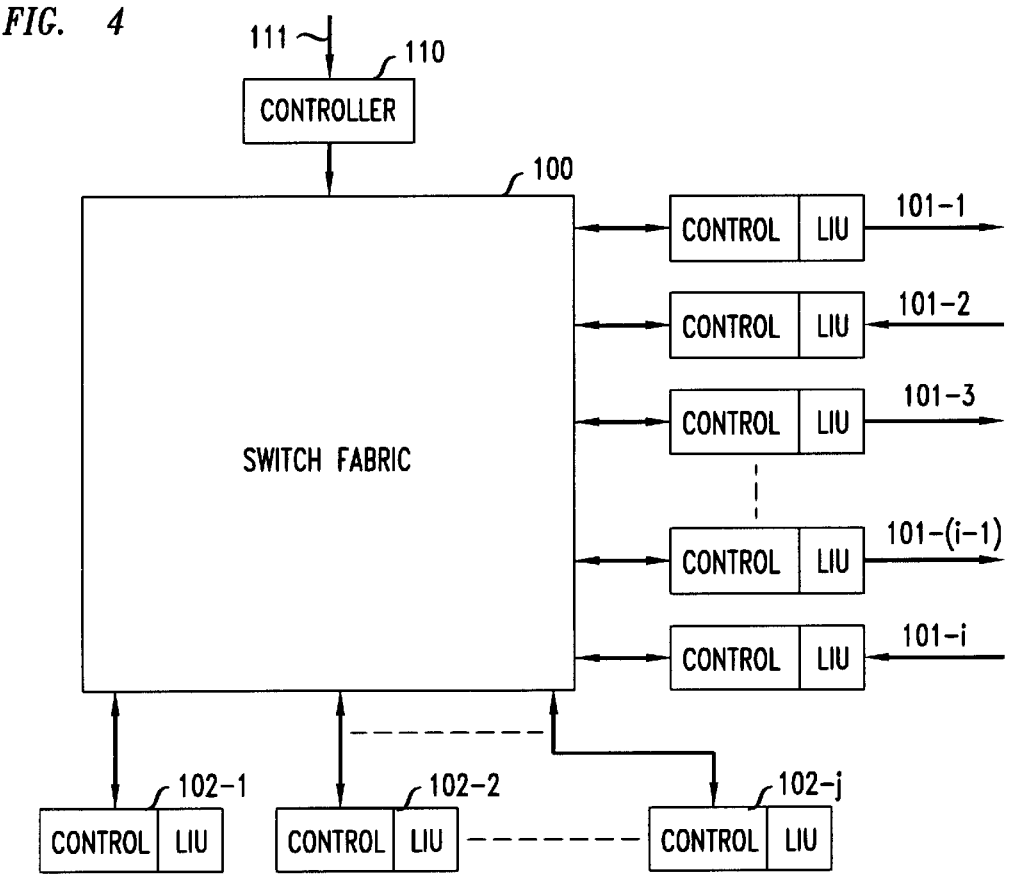
FIG. 4 presents a block diagram of a flexible DCS in accordance with the principles disclosed herein.

FIG. 4 depicts a block diagram of a flexible DCS illustrative of the principles disclosed herein. It comprises a cross connect 100, a plurality of line interface units 101-1, 101-2, . . . 101-i, a plurality of drop interface units 102-1, 102-2, . . . 102-j, and a DCS controller 110. Controller 110 commands the provisioning of cross connect 100, and the controllers that are associated with each of the interface units (the connection between controller 110 and the controller within each of the line interface units is not shown for sake of simplicity). The line interface unit controllers perform the same sensing operations that the controllers of prior art line interface units sense, except that instead of controlling the cross connect fabric of its associated ADM,portion of the integrated DCS, the controller in the flexible DCS primarily communicates this information to controller 110. Controller 110 is the same as the controller of prior art integrated DCS, except that it is also responsive to signals provided by the line interface units' controllers, performs the necessary processing, and controls cross connect fabric 100 to effect the same type of switching that, in the prior art integrated DCS, is performed in the switching fabric in the ADM portion of the integrated DCS. In particular, controller 110 is responsible for communicating all necessary information between the line interface units that have been specified (through software control exercised via control lead 111) to belong to a given ring. For example, controller 110 is responsible for insuring that the SONET K-byte messages are communicated between the line interface units of each specified ring.

To perform the functions that controller 110 now needs to perform in excess of the functions that prior art controllers of integrated DCSs have, controller 110 is augmented to perform the necessary control functions. To a large extent, these control functions are merely ported from the controller of the ADM portions of the integrated DCS. Where the controller is program controlled—which in the preferred embodiment it is—this porting is merely a porting of software. The ported functionality can be placed in one controller processor, or it can be installed in an adjunct processor of controller 110. The latter option might be better suited for the high speed rerouting in response to a failure condition.

Remembering that each four-fiber SONET ring has four line interfaces, it may be realized that it matters little if provisioning of line interface units were restricted to pairs of line interface units rather than individual line interface units. In embodiments where this restriction is accepted, the pairs of line interface units are advantageously combined to form enhanced line interface units. The pairs in this case would contain both the service and protection line interface units. These enhanced line interface units also improve operation of the flexible DCS by including switching circuitry for diverting traffic from one line interface unit to the other (e.g. diverting ring traffic that flows counterclockwise to the fiber that carries traffic clockwise). Such switching can be under control of the controllers associated with the enhanced line interface units in response to direct detection of a failure condition, or in response to a command from controller 110.

Figure 5:
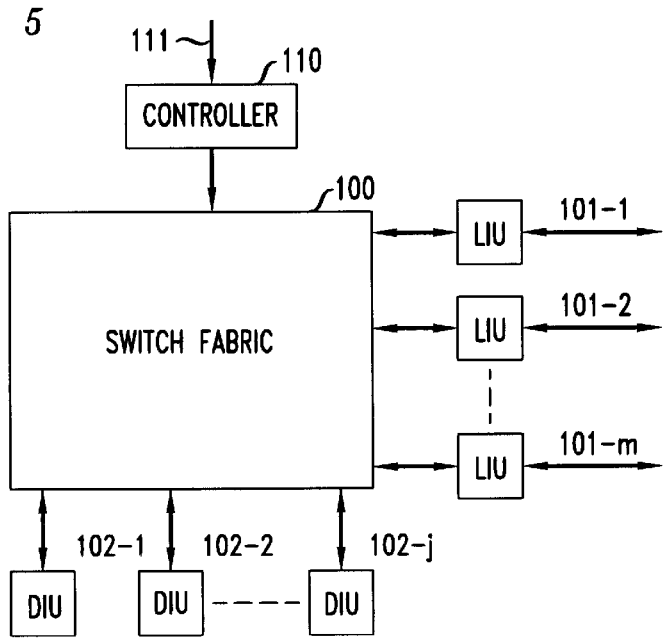
FIG. 5 presents another block flexible DCS in accordance with the principles disclosed herein where paths in both directions are multiplexed onto fibers.

Of course, persons who are skilled in the art will recognize that the fiber lines in one direction can be further multiplexed using wavelength multiplexing on to a single fiber. This is depicted in FIG. 5 (although the controllers within the line interface units are not shown for sake of simplicity).

FIG. 6 illustrates a very small SONET network that employs the flexible DCSs (F-DCSs) disclosed herein. It comprises flexible DCSs 120,130, 140, 150, and 160. Each of the flexible DCSs comprises a switching fabric (such as element 121 shown within F-DCS 120), a controller (such as element 122 shown within F-DCS 120), a plurality of line interface units (such as element 123 shown within F-DCS 120), and drop interface units (such as element 124 shown within F-DCS 120). It may be noted that the FIG. 6 F-DCSs can have different numbers of line interface units and drop interface units. Moreover, it may be noted that DCS 120 shows only 3 line interface units, and also shows 9 tributaries, with three going to each of the three multiplexers 125-1, 125-2, and 125-3. Of course, the number of tributaries (as well as the number of fibers and multiplexers) is a design choice, but each tributary interfaces a line interface unit.

Between the F-DCSs, which are in different geographical locations, the network consists of fiber spans with, possibly, one or more interposed ADMs. In FIG. 6, no such ADMs are shown for the sake of simplicity. The standard ADM can interwork on the same ring with the flexible DCS. Thus, in the illustrative FIG. 6 arrangement, there happen to be fiber spans that connect F-DCS 120 to DCS 130, 140, and 160; there are fiber spans that connect F-DCS 130 to F-DCS 150 and 160, and there are fiber spans that connected F-DCS 140 to F-DCS 150 and 160.

Because selecting one line interface unit as the incoming port of a ring does not, in the flexible DCS of FIG. 6, dictate the use of a particular line interface unit for the outgoing port of the ring, a network administrator has substantial flexibility in establishing rings. This flexibility is limited only by whether an idle line interface unit is found in the F-DCS that is connected to any fiber that goes to the desired destination F-DCS. Through communication to the respective controllers of the F-DCS, an network administrator can provision the network by selecting line interface units that are connected to fiber spans that go to desired locations and assigning the selected interface units to form rings as desired.

Illustratively, to form a F-DCS 120-130-150-140-120 ring, the network administrator can assign to this ring 1. one line interface unit that is connected to multiplexer 125-1 (arbitrarily),
2. a line interface unit that is connected to multiplexer 135-1 which is associated with the selected line interface unit of multiplexer 125-1,
3. a line interface unit that is connected to multiplexer 135-3 (arbitrarily),
4. a line interface unit that is connected to multiplexer 155-1 which is associated with the selected line interface unit of multiplexer 135-3,
5. a line interface unit that is connected to multiplexer 155-2 (arbitrarily),
6. a line interface unit that is connected to multiplexer 145-3 which is associated with the selected line interface unit of multiplexer 155-2,
7. a line interface unit that is connected to multiplexer 145-1 (arbitrarily), and
8. a line interface unit that is connected to multiplexer 125-2 which is associated with the selected line interface unit of multiplexer 145-1.

To form a second ring, that encompasses, for example, DCS 140-160-130-150-140, the network administrator can assign to this ring 1. one line interface unit that is connected to multiplexer 145-2 (arbitrarily),
2. a line interface unit that is connected to multiplexer 165-2 which is associated with the selected line interface unit of multiplexer 145-2,
3. a line interface unit that is connected to multiplexer 165-3 (arbitrarily),
4. a line interface unit that is connected to multiplexer 135-2 which is associated with the selected line interface unit of multiplexer 165-3,
5. the remaining line interface unit that is connected to multiplexer 135-3,
6. the remaining line interface unit that is connected to multiplexer 155-1 which is associated with the selected line interface unit of multiplexer 135-3,
7. the remaining line interface unit that is connected to multiplexer 155-2, and
8. the remaining line interface unit that is connected to multiplexer 145-3, which is associated with the selected line interface unit of multiplexer 155-2.

At a later time, the network administrator might wish to modify the first ring to consist of DCSs 120-130-160-140-120. A simple perusal of the FIG. 4 network reveals that it is easily accomplished in the manner outlined above.

In the above description of the provisioning process, it is mentioned that the network administrator is limited by whether line interface units exist at the DCSs that are to make up a ring (that have not already been provisioned) which are connected to fiber spans that connect those DCSs. This information can be maintained at a central location by effectively keeping an image of the available and the occupied network resources. This information can also be obtained from the network itself by each DCS building and maintaining a database of the connections that it has. For example, when a line interface unit detects that a fiber has been connected to it, it sends message (for example, using the SONET DCC) in the outgoing direction announcing its own ID. Similarly it receives the ID of the remote end node. This information is stored in each of the DCSs and, when the network administrator wishes to create a ring that involved a particular DCS, the network administrator queries the DCS and obtains from it the information about which links exist between the queried DCS and all other DCSs, and whether they are available for provisioning.

As stated earlier, the communication of the K-byte messages is essential, and in the above discussion, the responsibility for effecting this communication (from an incoming port of a ring to an outgoing port of a ring) is assigned to controller 110. Another implementation is to assume that there is always a traffic connection between the incoming port and the outgoing port, and to use the same K overhead bytes for this communication. The controllers in the line interface units place the messages (in the same format as the existing K-byte message set) onto this overhead with low latency. Still other implementations are possible, such as a low speed switch to route only the overhead bytes.

Although all of the ring switching can be performed in the DCS fabric, another implementation uses a fabric associated with the integrated ADM line interface, under the case where both line interfaces in one direction (e.g. east) are associated with the same ADM fabric. In this case, some of the span switching functions and ring switching functions can be performed by the ADM fabric, while some of the functions are still performed by the DCS cross-connect fabric.

The above discloses the principles of this invention by means of illustrative embodiments thereof. It should be understood, however, that various extensions and modifications could be made without departing from the spirit and scope of this invention, as defined in the accompanying claims. For example, although the discussion focused on the SONET ring protocol, other ring protocols can be used.

The discussion above focused on a single pair of rings that are interconnected with a flexible DCS. In general, there can be multiple rings connected through the SONET DCS. Typically in an ADM-based ring or fixed DCS-based ring, each of the rings acts independently as far as the communication and switching are concerned. However, if traffic drops from one ring and goes to another ring in the same node, without using external drop. The logic in the DCS controller 110 takes into account the coupling between the rings for flexible ring inter-connection and, therefore, the proper switching command to the fabric.

What is claimed is:

1. A SONET digital cross connect apparatus including a cross connect fabric, at least three line interface units, each of which has a control module and a bi-directional data port for coupling to a transmission facility, the apparatus further including a controller that interacts with said cross connect fabric and said control modules, characterized by:

said line interface units are adapted to connect to an optical fiber;

a connection between each of said line interface units and said cross connect fabric, and between said controller and said cross connect fabric, is adapted to allows said controller to connect said port of a first one of said line interface units to said port of any other of said of said line interface units in a manner that causes said first line interface unit and said other unit connected thereto through said cross connect to form a part of a traffic flow of a communications ring, and further adapted to allow said control module of said each line interface unit to communicate with said controller; and at least one drop interface unit connected to said cross connect fabric that performs add/drop operations, where said controller is adapted to receive commands that specify said first line interface unit and said other line interface unit to belong to said communication ring, and each of said control modules in each of said interface units reports to said controller transmission failure conditions on its associated port.

2. The apparatus of claim 1 further comprising means for communicating SONET K-byte messages between said first line interface unit and said other line interface unit.

3. The apparatus of claim 1 further comprising means included in said controller for communicating messages between said first line interface unit and said other line interface unit.

4. The apparatus of claim 2 where said means is a second cross connect fabric.

5. The apparatus of claim 2 where said means comprises said path established in said cross connect fabric by said controller.

6. The apparatus of claim 1 where each of said drop interface units including a bi-directional output port.

7. The apparatus of claim 1 where said line interface units are adapted for handling a fiber that carries traffic into said apparatus, and a fiber that carries traffic out of said apparatus.

8. The apparatus of claim 7 where said line interface units include switching fabric for routing traffic from one of the fibers connected to the line interface unit onto the other of the fibers connected to the line interface unit.

9. The apparatus of claim 1 where said line interface units are adapted for handling a fiber that carries traffic into said apparatus as well as out of said apparatus.

10. The apparatus of claim 9 where said line interface units include switching fabric for routing traffic from said fiber to a fiber associated with another line interface unit.

11. The apparatus of claim 10 where said line interface units include switching fabric for routing traffic into said apparatus out of said apparatus over the same fiber.

12. The apparatus of claim 1 where said line interface units are adapted for handling two fibers that carry traffic into the line interface unit and two fibers out of the line interface unit.

13. The apparatus of claim 12 where said line interface units include switching fabric for routing traffic arriving at said apparatus from one of the fibers that carry traffic into the line interface unit to the any of the other of the fibers connected to the line interface unit.

14. The apparatus of claim 1 where said line interface units are adapted for handling a first fiber that carries traffic into and out of said apparatus and a second fiber that carries traffic into and out of said apparatus.

15. The apparatus of claim 14 where said line interface units include switching fabric for routing traffic between said first fiber and said second fiber.

16. The apparatus of claim 6 where said bi-directional output port of a drop unit is adapted to handle a bandwidth that is narrower than bandwidth of signals at said bi-directional ports of said line interface units.

* * * * *